(12) United States Patent  
Gagliano

(10) Patent No.: US 10,591,904 B1
(45) Date of Patent: Mar. 17, 2020

(54) INDUSTRIAL SAFE INPUT DEVICE

(71) Applicant: Amazon Technologies, Inc., Seattle, WA (US)

(72) Inventor: Gabriel Gagliano, Melrose, MA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 15/619,053

(22) Filed: Jun. 9, 2017

(51) Int. Cl.
*G05B 19/418* (2006.01)

(52) U.S. Cl.
CPC ............. *G05B 19/4185* (2013.01); *G05B 2219/31151* (2013.01); *G05B 2219/32128* (2013.01)

(58) Field of Classification Search
CPC ...... G05B 19/4185; G05B 2219/31151; G05B 2219/32128
See application file for complete search history.

(56) References Cited

U.S. PATENT DOCUMENTS

| | | | |
|---|---|---|---|
| 4,585,930 A * | 4/1986 | Casden | G06K 7/087 235/382 |
| 6,211,475 B1 | 4/2001 | Ozaki | |
| 2006/0260054 A1* | 11/2006 | Lubbers | A61G 7/018 5/621 |
| 2010/0116863 A1* | 5/2010 | Suda | B25C 1/008 227/8 |
| 2012/0235902 A1* | 9/2012 | Eisenhardt | A42B 3/042 345/156 |
| 2012/0252608 A1* | 10/2012 | Calzolari | A63B 69/0013 473/499 |
| 2013/0265457 A1* | 10/2013 | Henty | H04N 21/42222 348/211.99 |
| 2015/0323388 A1* | 11/2015 | Kostic | A61G 13/10 250/338.1 |
| 2015/0345630 A1* | 12/2015 | Wang | F16H 59/48 474/11 |
| 2017/0100185 A1* | 4/2017 | Lowry | A61B 18/1402 |
| 2017/0213404 A1* | 7/2017 | Sivalingam | G07C 9/00103 |
| 2017/0320205 A1* | 11/2017 | Schaer | B25D 16/00 |
| 2018/0029248 A1* | 2/2018 | Firth | B27C 5/10 |
| 2018/0043549 A1* | 2/2018 | Su | B25J 9/12 |
| 2018/0062784 A1* | 3/2018 | Hodge | H04K 3/825 |

* cited by examiner

*Primary Examiner* — Thomas C Lee
*Assistant Examiner* — Michael Tang
(74) *Attorney, Agent, or Firm* — Kilpatrick Townsend & Stockton LLP

(57) ABSTRACT

A device for controlling a user input device to prevent inadvertent activation of the user input device includes a user input device for receiving user commands and an activation trigger associated with the input device. The activation trigger includes a mechanism that prevents incidental actuation. When the activation trigger is actuated, the input device is enabled to receive user commands for an amount of time dictated by a timer, and disabled when the timer has exhausted the amount of time.

25 Claims, 12 Drawing Sheets

INDUSTRIAL SAFE INPUT DEVICE

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks increase substantially. In inventory systems tasked with responding to large numbers of diverse inventory requests, inefficient utilization of system resources, including space and equipment, can result in lower throughput. As the capabilities of inventory systems are expanded, improvements in safety can be made as well.

BRIEF DESCRIPTION OF THE DRAWINGS

Various embodiments in accordance with the present disclosure will be described with reference to the drawings, in which:

FIG. 2 illustrates an example input device employing an enabling switch, in accordance with embodiments;

FIG. 3 illustrates an example input device employing rotatable keycard receiver, in accordance with embodiments;

FIG. 4 illustrates an example input device employing a biometric reader, in accordance with embodiments;

FIG. 5 illustrates an example input device employing a switch cover, in accordance with embodiments;

FIG. 6 illustrates an example input device employing separated key press activation, in accordance with embodiments;

DETAILED DESCRIPTION

Figure 1:
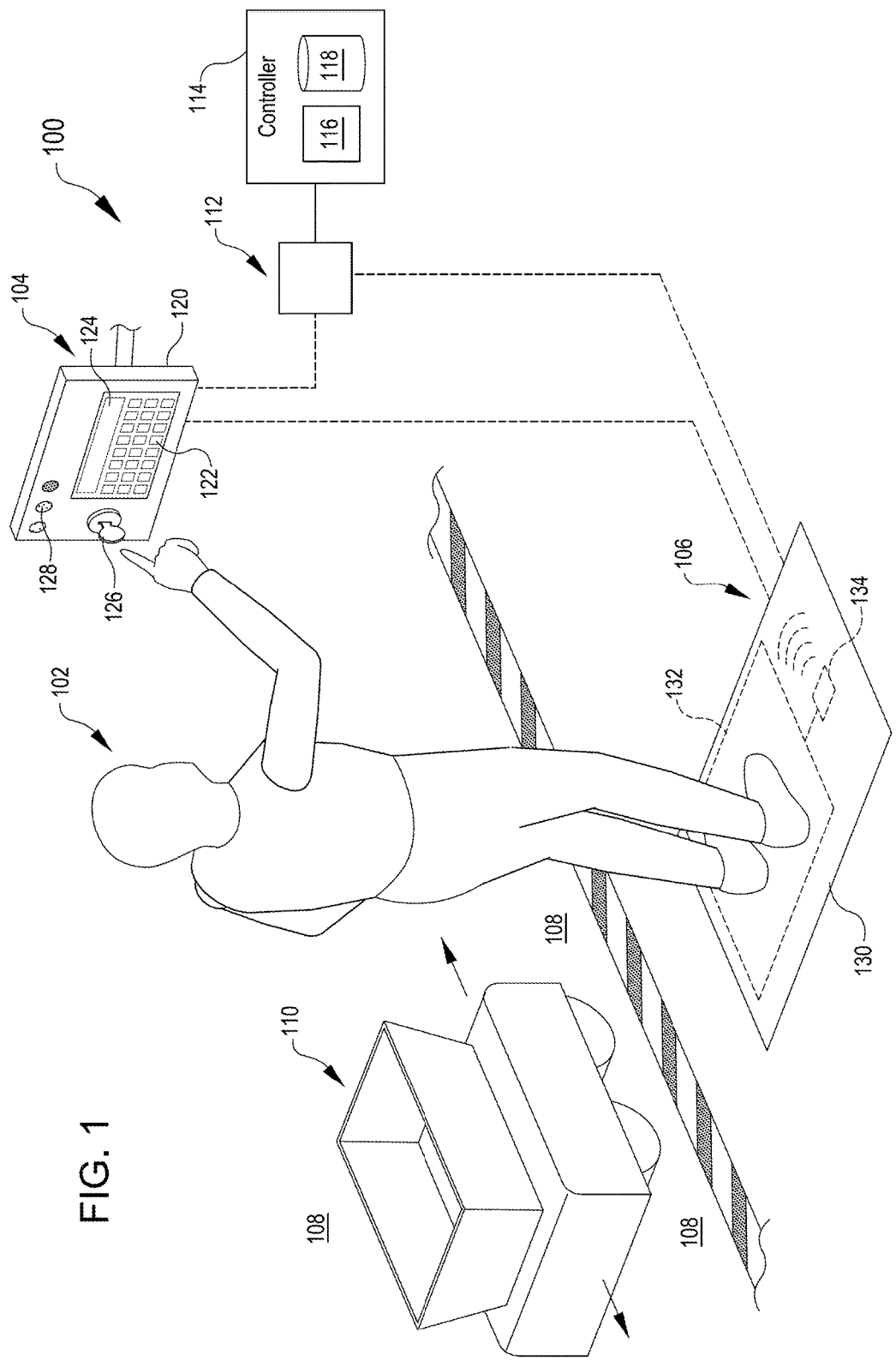
FIG. 1 illustrates an example inventory system that includes an industrial safe input device with an activation trigger, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein described relate generally to an input device for use in an industrial application, such as a sorting or inventory management facility, where agents interact with or work alongside automated equipment. Principles described herein may translate readily to other industrial systems, such as package handlers, factory settings, or the like. An industrial safe input device includes input controls such as input controls operable by a user to generate input to the industrial system. Such input controls can include physical input keys, as on a hardware keyboard or keypad; may include virtual keys displayed on a touchscreen or mobile device such as a tablet, smartphone, portable scanner, or remote control, or may include alternative input devices such as computer mice, joystick controls, wheels, dials, or the like.

The input device includes an activation trigger that a user can toggle between a disabled configuration and an enabled configuration. Generally, the activation trigger will default to the disabled configuration, or will return automatically to the disabled configuration by, e.g., a spring mechanism or motor, either immediately upon release by the user or upon exhaustion of a timer activated when the activation trigger is enabled. An output, such as an indicator light, display, or other user-detectable signal may be produced by the input device to communicate the enabled status of the input controls to the user when the input device is enabled. The activation trigger requires a physical action on the part of a user to actuate which is different than that required to merely input commands, and which is more difficult to perform accidentally. For example, a nonlimiting selection of suitable activation triggers includes rotatable keys, enabling switches, biometric or key readers, covered switches, or multiple key-press systems, in accordance with embodiments.

A controller connected with the input device, which may be an embedded onboard controller, can then cause the input controls to receive user commands for a predetermined amount of time after the activation trigger is actuated by the user, and cause the output to communicate the enabled status of the input controls to the user. However, the input device is activated for only a short, preset window of time selected to accommodate the tasks for which the input device is intended, e.g. on the order of about 5 seconds to about 30 seconds, or more depending on the specific tasks for which an input device is used. In accordance with some embodiments, the input device can disable input from the input controls to the inventory system if the activation trigger is returned to the disabled configuration earlier than the timer, as in the case of an enabling switch. In some cases, the timer may be replaced entirely with the use of an enabling switch, which disables the input device when in a disabling configuration.

The requirement that an operator actuate an activation trigger prior to issuing commands at a user input device prevents inadvertent activation of commands at the input device, which may otherwise occur accidentally. The requirement may also facilitate greater operator engagement by enforcing a brief pause prior to the entry of system commands. Further details regarding specific embodiments are described below with reference to the figures.

FIG. 1 illustrates an example inventory system 100 that includes an industrial safe input device 104 with an activation trigger 126, in accordance with embodiments. The system 100 includes automated industrial equipment 110, shown herein as a robotic unit, operating in an inventory system 108 near an operator 102. The operator 102 is able to communicate commands to a system controller 114, which includes a processor 116 and nontransitory memory 118 for controlling operation of various automated systems in the inventory system 108. Commands are communicated via the user input device 104, which can transmit commands by way of a network 112 to the controller 114.

The user input device 104 includes casing 120 having input controls 122 and a display 124 for facilitating user input from the operator 102, as well as an activation trigger 126 which can be toggled by the operator. In operation, the input device 104 is disabled by default. In some cases, the disabled configuration prevents the input device 104 from recognizing keystrokes at the input controls 122; or in some cases, the disabled configuration may still allow the input device 104 to log keystrokes, but prevents the transmittal of commands from the input device to the controller 114. Various other forms of input controls may be used in lieu of input controls 122, such as dials, switches, touch-screen buttons, or the like, in accordance with embodiments. The input device 104 can be reconfigured to an enabled configuration via manual actuation of the activation trigger 126. In the case where the activation trigger 126 is a rotatable key, as shown, the manual actuation is a key turn. Various forms of activation triggers are within the spirit of the present disclosure, and may include any suitable activation means that is distinct from a simple key press or combination that might be accidentally performed. According to various embodiments, the activation trigger can be any suitable control for activating the input device 104 that is difficult or impossible to activate by an incidental touch or accidental motion. For example, suitable activation triggers can require, e.g., a continuous motion that changes direction such as turning a rotatable key; a multi-step action such as a series of keystrokes, an activation that requires first lifting a cover, or an activation that requires both inserting and turning a key or keycard. According to some embodiments, the activation trigger can be any suitable control for activating the input device 104 that is both difficult to activate by accident and that differs significantly from the conventional means by which controls are activated at the input device. For example, for input controls in the form of physical keys or a touchscreen keypad, a suitable activation trigger is a control other than a key press, e.g., a turning element like a key, dial, or lever. Generally, a suitable activation trigger can be any auxiliary control that is not amenable to accidental activation, and that is difficult to actuate except by a purposeful physical action in a different direction or plane than actions suitable for using the input device.

The activation trigger 126 initiates a timer when reconfigured to the enabled configuration. According to some embodiments, the activation trigger 126 may return gradually to its resting orientation in the disabled configuration as the timer counts down. In some embodiments, the timer runs for a predetermined period of time without tracking the motion of the activation trigger 126. Once in the enabled configuration, and for the duration of a predetermined amount of time set by the timer, the input device 104 can receive inputs from the operator 102 at the input controls 122 and communicate with the controller 114. This predetermined amount of time may vary according to the specific tasks for which the input device 104 is provided, (e.g., 5 to 30 seconds). According to various embodiments, the timer can count down a configurable amount of time that can vary according to operator preferences, needs, or other criteria that impact the time required to perform a task. For example, a configurable amount of time may be set, e.g. by an operator, or by a user prior to use of the input device 104. In some embodiments, a user can configure the amount of time on the timer to account for user speed, e.g., a user might provide a longer activation time, which may be restricted by a set limit (e.g., 30-60 seconds). According to some other embodiments, the timer can be configured to provide a certain timer depending on the specific task for which the input device 104 is used, e.g., for a first category of task, like simple item loading or unloading, the controller 114 can direct the input device 104 to accept inputs for a brief period of time (e.g., on the order of 5-30 seconds). For a second category of task, like complex item sorting or manipulation tasks, the timer can be configured to run for a longer period of time (e.g. 10-30 seconds, or longer). According to embodiments, the predetermined amount of time may be cut short by various acts. For example, the predetermined amount of time may be ended when a command has been successfully entered at the input device 104, thus requiring a new actuation of the activation trigger 126 before new commands can be issued. This configuration may be desired to prevent operators from losing time in unsuccessful attempts to squeeze in final command lines on a stale timer. By way of another example, the predetermined period of time may be ended when the activation trigger 126 is reverted to the disabled configuration, thus allowing an operator to cut off the timer at will by reverting the activation trigger 126.

According to some embodiments, an output 128 can provide a visual indicator of the status of the input device 104 for the benefit of the operator 102, e.g., displaying a first color, such as a red light, when the input device is in a disabled configuration; and a second color, such as a green light, when the input device is in an enabled configuration; and/or other lights or light patterns. For example, the output 128 may monitor a timer associated with the enabled configuration and display a third colored light, e.g. a yellow light, or a flashing light, when the timer is stale and the input device is about to deactivate. According to some embodiments, the output 128 can indicate that the timer is stale by changing one or more aspects of the output display, such as a color of an output light, or a frequency of a flashing light. For example, when a timer has counted down to a predetermined remaining time (e.g. 2-10 seconds) the output can begin to flash to indicate that the timer is nearly expired. In some embodiments, a flashing output can flash with increasing frequency as the timer counts down closer to zero.

According to some embodiments, the system 100 can further include means to verify the position of the operator 102 before allowing the operator to enable the input device 104. For example, in one embodiment, a sensor assembly 106 associated with the input device 104 may be positioned within a safe work area 130. The sensor assembly 106 can include a sensor 132, such as a pressure plate or similar sensor, which can communicate the presence or absence of the operator 102 to the input device 104 either directly, via a wired or wireless connection, or via a network 112. In some cases, the sensor assembly 106 can include a transmitter 134 configured to communicate data concerning whether the operator is in the safe work area 130 to the controller 114 or to the input device 104, particularly if the input device 104 is a portable device such as a tablet, smartphone, or the like. In operation, the input device 104 can lock out the enabled configuration while the operator 102 is not detected in the safe work area 130 in order to prevent the operator from inadvertently activating aspects of the system 100 while out of position. According to some embodiments, the sensor assembly 106 can include an array of sensors that detect the position of the operator 102 with even greater precision, e.g. to detect whether the operator is leaning from the safe work area 130 or otherwise out of position. For example, the sensor assembly 106 can include sensors to detect the weight distribution of the operator 102, in order to determine whether the operator is placing weight at an edge of the safe work area 130 or is partially outside of or leaning out of the safe work area. According to some embodiments, the sensor assembly 106 may include one or more sensors other than pressure sensors that scan a vicinity of the safe work area 130, e.g. optical sensors, cameras, or the like, for detecting when the operator 102 is extending a body part out of the safe work area. Accordingly, in various embodiments, the system 100 can detect whether an operator is complying with safety requirements to remain in the safe work area 130 before enabling the input device 104.

FIGS. 2-6 show aspects of various embodiments of industrial safe input devices with activation triggers. The input devices described in the following figures may be applied to a system such as system 100 shown in FIG. 1.

Figure 2:
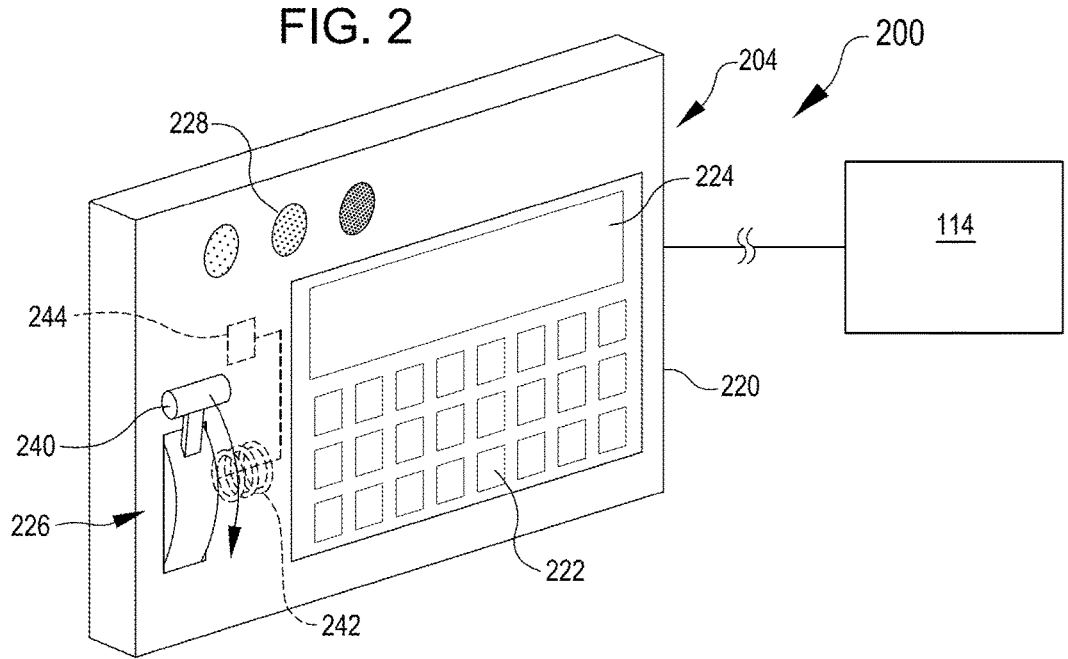
FIGS. 2-6 show aspects of various embodiments of industrial safe input devices with activation triggers.

FIG. 2 illustrates an example system 200 employing an input device 204 with an enabling switch 226, in accordance with embodiments. The system 200 is configured to allow the input device 204 to communicate commands to a controller 114, analogous to controller 114 discussed above with respect to FIG. 1. The input device 204 includes a casing 220 equipped with input controls 222 and display 224, as well as an output 228 for communicating the enabled/disabled status of the input device 204 to an operator.

In operation, the input device 204 is by default in a disabled configuration until enabled via actuation of an activating trigger 226. The activating trigger 226 shown here includes a lever 240 connected with a control circuit 244 that enables or disables the input controls 222 and activates a timer when the lever is depressed. The lever 240 can be configured to automatically return to the disabled configuration after each actuation by way of, e.g., a spring mechanism 242 connected with the activating trigger 226. In some embodiments, the activating trigger 226 may be configured to immediately disable the input controls 222 upon return to its default, disabled configuration, thus requiring that an operator maintain pressure on the lever to issue commands.

Figure 3:
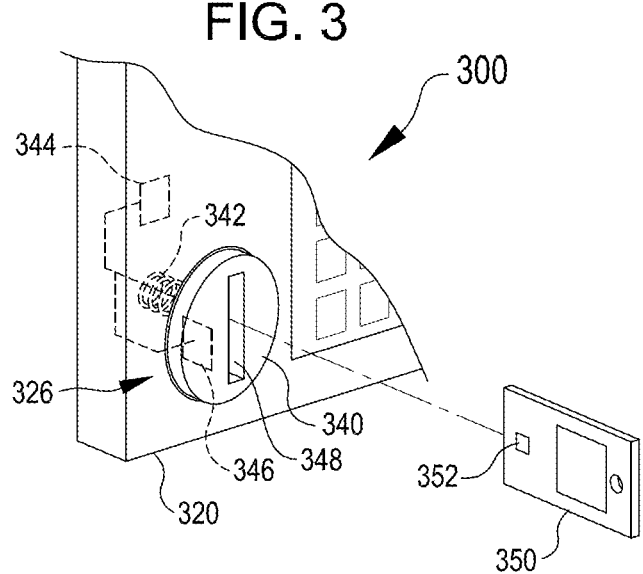

FIG. 3 illustrates an example input device 300 employing an activating trigger 326 that includes a rotatable keycard receiver 340 positioned in a casing 320, in accordance with embodiments. A receiving slot 348 is open to receive a key card 350, which can be used by an operator to turn the activating trigger 326 when the key card is inserted. Like the lever 240 of FIG. 2, the rotating keycard receiver 340 is operably connected with a control circuit 344 for enabling associated controls when the input device 300 is in an enabled configuration. The rotating keycard receiver 340 can be connected with a spring mechanism 342 to return the receiver to a default, disabled configuration after actuation. In accordance with specific embodiments, the receiving slot 348 may include a key reader 346 capable of reading an identifier 352 associated with the key card 350. For example, in some cases, the input device 300 may log the identifier 352 whenever the input device is brought to the enabled configuration, thus keeping records to identify an operator and/or to track usage of the input device 300, to confirm access permission for a particular operator based on the identifier, or to log performance metrics, such as a rate of performing tasks, and associating the metrics with the identifier.

Figure 4:
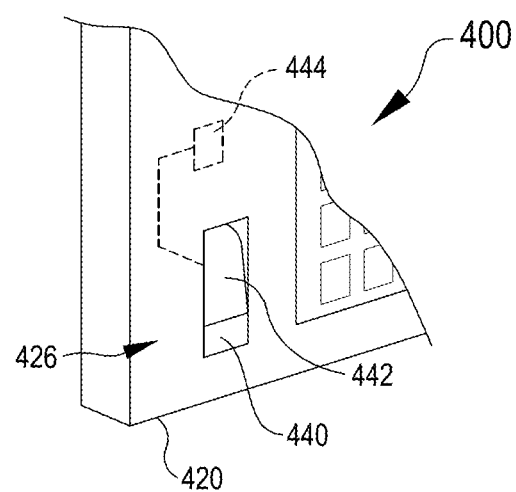

FIG. 4 illustrates an example input device 400 employing an activating trigger 426 that includes a biometric reader 440, shown herein as a fingerprint scanner, in accordance with embodiments. The biometric reader 440 is positioned in a casing 420 and operably connected with a control circuit 444 for enabling associated controls when the input device 400 is in an enabled configuration. In operation, an operator can enable the input device 400 by activating the biometric reader 440 at a scanner 442. In like manner to the key card described with reference to FIG. 3, the biometric reader 440 can be used to obtain and subsequently log data concerning the identities of users of the input device 400.

Figure 5:
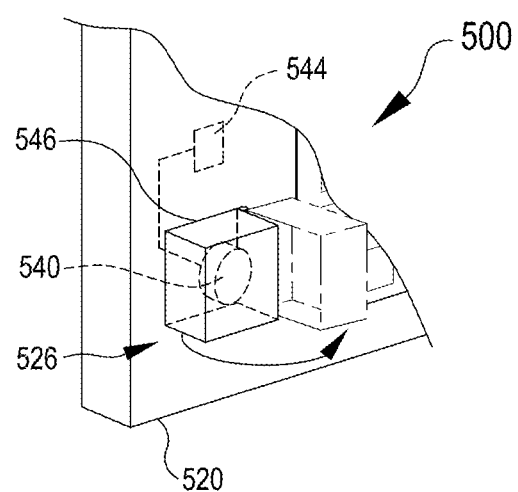

FIG. 5 illustrates an example input device 500 employing an activating trigger 526, including a switch cover 546, in accordance with embodiments. The activating trigger 526 is connected with a casing 520, and includes a switch 540 which is covered by a switch cover 546 when disabled. The switch 540 is operable connected with a control circuit 544 for enabling associated controls when the input device 500 is in an enabled configuration. In operation, an operator can enable the input device 500 by lifting the switch cover 546 in order to actuate the switch 540. In some specific embodiments, the switch cover 546 can return when released via, e.g., a spring connection with the casing 520, or via gravity.

Figure 6:
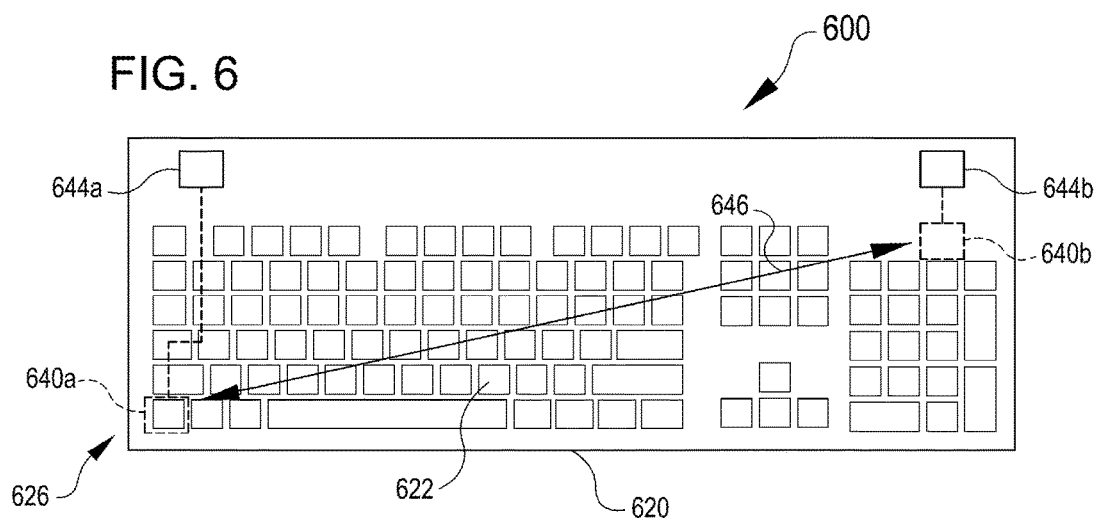

FIG. 6 illustrates example input device 600 employing separated key press activation at separated activation triggers 626, in accordance with embodiments. The activating triggers 626 include multiple discrete input controls 640a, 640b, in the casing 620, which are separated from each other by a distance 646 that spans at least one control of the input controls 622. The discrete input controls 640a, 640b can communicate with respective control circuits 644a, 644b to detect a key press order of the input controls, and activate the keyboard when the key press order is correct. The separation of the discrete input controls 640a, 640b minimizes the possibility of accidental activation.

Embodiments of input devices described above could be placed within an inventory system at any suitable location for providing controls to an operator including at workstations, on mobile devices, or even on robotic drive units, as discussed with reference to FIG. 7.

Figure 7:
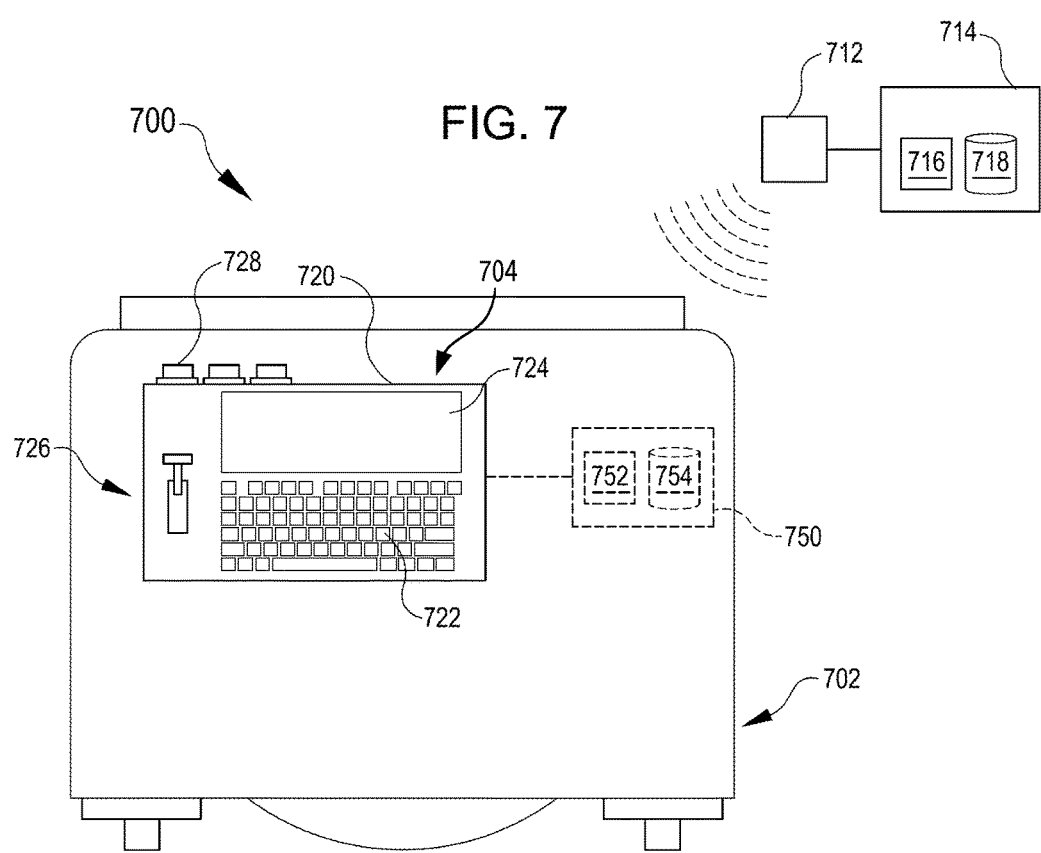
FIG. 7 illustrates an example inventory system that includes an industrial safe input device connected with an automated industrial machine, in accordance with embodiments.

FIG. 7 illustrates an example inventory system 700 that includes an industrial safe input device 704 connected with an automated robotic drive unit 702, in accordance with embodiments. The drive unit 702 can include any suitable features for performing tasks in an industrial or inventory facility, such as any suitable form of drive, item carrying apparatus, sorting or lifting apparatus, or the like. The drive unit 702 can be substantially autonomous, or may be configured to communicate with a controller 714 via a network 712. The drive unit 702 can include an onboard controller 750 including a processor 752 and memory 754 that can contain and process command logs associated with the drive unit. The controller 714 may also include processor 716 and memory 718 for directing the drive unit 702.

An input device 704 can be connected with the drive unit 702 and used to issue direct commands to the drive unit, or to communicate commands to and from the system controller 714. According to some embodiments, the input device 704 includes a casing 720 connected with an activation trigger 726 for configuring the input device in an enabled or disabled configuration, as well as a input controls 722 and display 724, and an output 728 for indicating status of the input device 704 to an operator. In operation, the input device 704 can be enabled for use via actuation of the activation trigger 726. The input device 704 can be subsequently disabled after a predetermined amount of time from actuation of the trigger 726, or alternatively, when the trigger 726 is allowed to return to its default or disabled configuration. According to some embodiments, the input device 704 can temporarily disable movement by the drive unit 702 in response to detecting an actuation of the activation trigger 726, so that an operator seeking to work on the drive unit can simultaneously enable the input device 704 while causing the drive unit to safely pause any ongoing action.

According to alternative embodiments, an input device like the input device 704 (FIG. 7) can be used as a control of a vehicle or of an autonomous or semiautonomous drive unit to trigger autonomous control or to rescind autonomous control in a self-driving application. For example, an activation trigger such activation trigger 726 can be used to enable an operator of a self-driving vehicle to safely activate, or deactivate, an autonomous mode of the vehicle. According to some embodiments, a self-driving vehicle or autonomous drive unit, like drive unit 702, can be configured to operate under user control until reconfigured to take over operation in a self-driving mode, where the switch to a self-driving mode is initiated by activation of the activation trigger 726, and optionally by a set of commands. In this manner, an autonomous drive unit or autonomous vehicle can be prevented from operating in response to inadvertent commands. According to some embodiments, the self-driving mode may be rescinded by receipt of any subsequent user commands, which is advantageous in cases where the operator of such a device is expected to retain the ability to quickly regain control at all times. According to some embodiments, the self-driving mode may be rescinded by specific user commands, such as a second activation of the activation trigger 726, which is advantageous in cases where it is undesirable for an operator to inadvertently resume control during operation.

Figure 8:
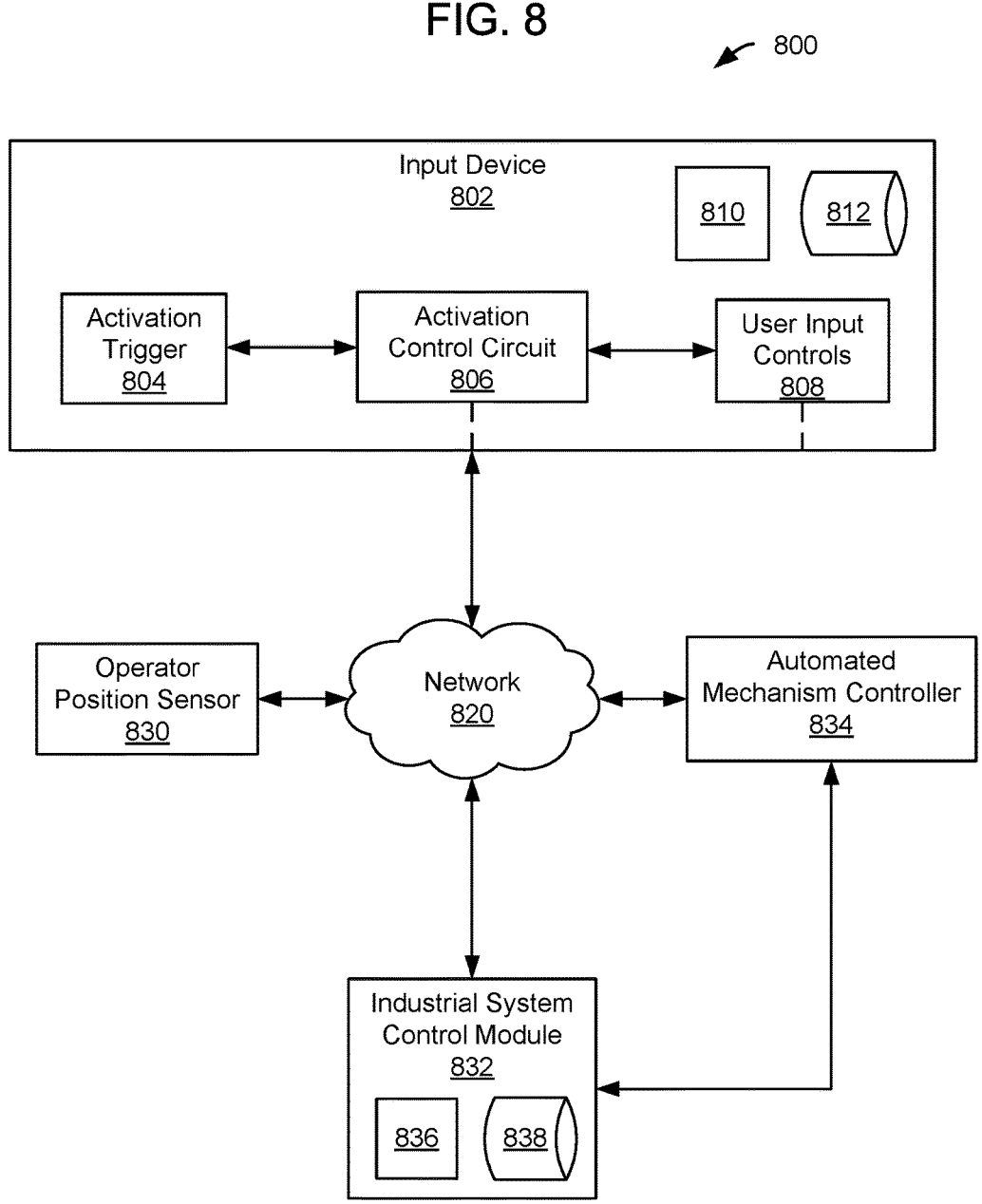
FIG. 8 is a simplified block diagram illustrating a first example system for controlling an industrial safe input device.

FIG. 8 is a simplified block diagram illustrating an example system 800 for controlling an industrial safe input device, in accordance with embodiments. The system 800 may be operable to control any suitable industrial safe input device or industrial system such as systems 100 or 700 shown in FIGS. 1 and 7, or the input devices shown in FIGS. 1-7. The control system 800 can include any or all of, or any suitable combination of the following modules.

An input device 802, which can include local processor 810 and memory 812, is operable to receive user input from an operator at user input controls 808 when the input device is enabled to receive and/or transmit user input. Control over the enabled or disabled configuration is exercised at an activation control circuit 806 that is operably connected with both an activation trigger 804 and with the user input controls 808. According to specific embodiments, an operator position sensor 830 may communicate with the activation control circuit 806 to indicate whether an operator is in position at a related work space associated with the input device 802. This indication regarding operator position may be used as an initial required condition for enabling the input device 802.

According to some embodiments, the activation trigger 804 can, when actuated, cause the activation control circuit 806 to release the user input controls 808 and permit inputs to register and be transmitted from the user input controls 808 via a network 820. User inputs can be transmitted to, e.g., one or more automated mechanisms via an automated mechanism controller 834, or to a system control module 832, which can further include processor 836 and memory 838 for controlling operation of various automated systems. According to some specific embodiments, the activation trigger 804 can enable the activation control circuit 806 to pass through commands received at the user input controls 808, such that the activation control circuit 806 performs a gateway function, preventing user inputs from being transmitted when the input device 802 is disabled, and facilitating the transmission of user inputs when the input device is enabled via the activation trigger 804.

Figure 9:
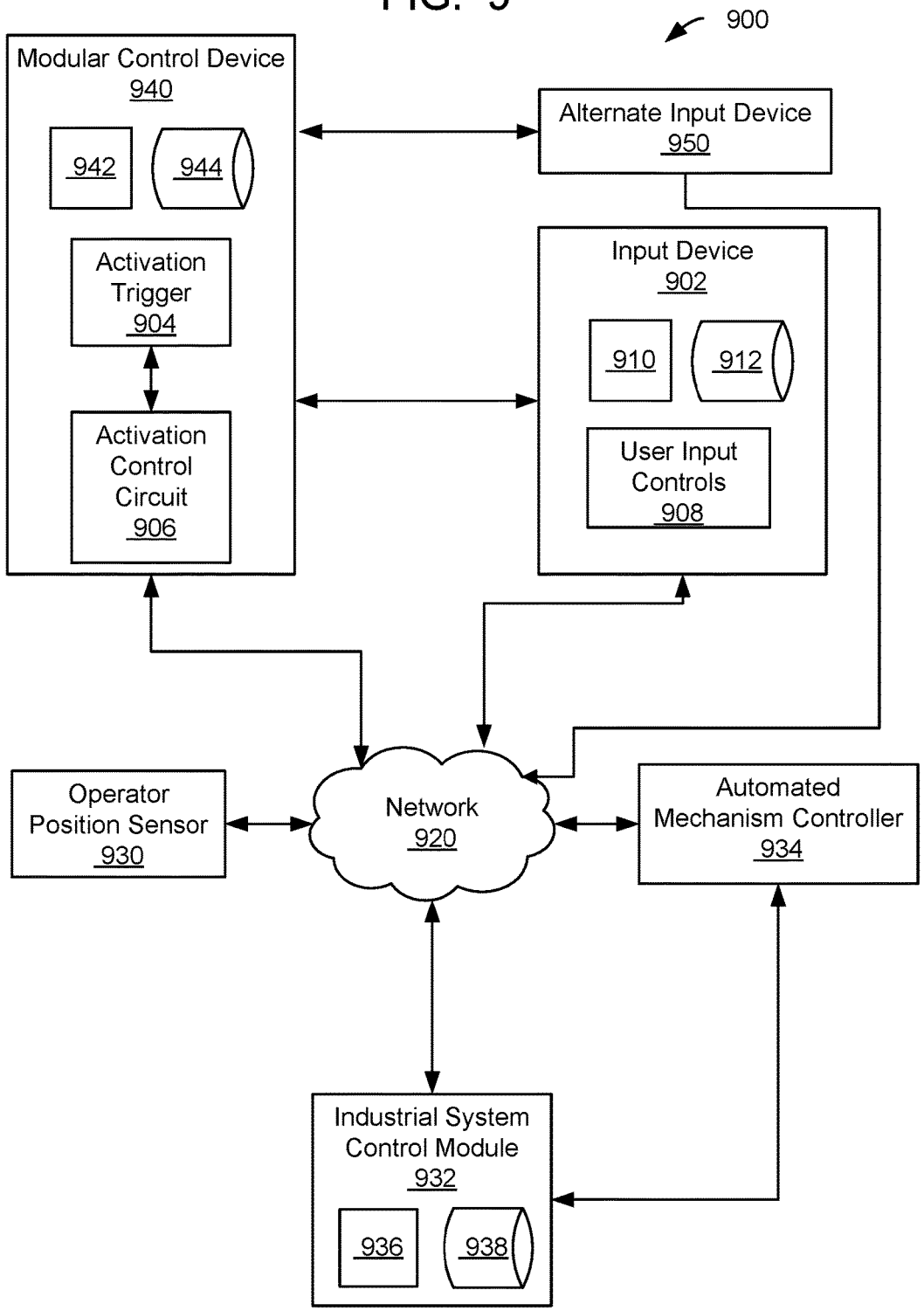
FIG. 9 is a simplified block diagram illustrating a second example system for controlling an industrial safe input device.

FIG. 9 is a simplified block diagram illustrating an example system 900 for controlling an industrial safe input device via a modular control device 940, in accordance with embodiments. The system 900 may be operable to control any suitable industrial safe input device or industrial system such as systems 100 or 700 shown in FIGS. 1 and 7, or the input devices shown in FIGS. 1-7. The control system 900 can include any or all of, or any suitable combination of the following modules.

An input device 902, which can include local processor 910 and memory 912, is operable to receive user input from an operator at user input controls 908 when the input device is enabled to receive and/or transmit user input. Control over the enabled or disabled configuration is exercised at an activation control circuit 906 contained in a modular control device, that is operably connected with both an activation trigger 904. In accordance with various embodiments, the modular control device 940 can be a removable controller, optionally containing a processor 942 and memory 944 having executable instructions thereon to operate the modular control device. The modular control device 940 includes an activation trigger 904, and an activation control circuit 906 that operate in a manner similar to the activation trigger 804 and control circuit 806 described above with reference to FIG. 8, when the modular control device 940 is connected with the input device 902. According to some embodiments, the modular control device 940 is configured to link both electrically and mechanically with the input device 902, e.g., by way of a physical data-carrying connection, such as a universal serial bus (USB) connection or comparable wired data connection. According to various other embodiments, the modular control device 940 can instead connect virtually with the input device 902, e.g. by way of a wireless data connection, e.g., any suitable RF connection including, but not limited to, Bluetooth®, a Wi-Fi (wireless fidelity) network, or the like. The modular control device 940 can be positioned in contact with, adjacent to, or at a physical remove from the input device 902. According to various embodiments, the modular control device 940 can connect with more than one, any potentially many, different input devices. In some cases, e.g. when the modular control device 940 is configured to connect wirelessly with the input device, a singular modular control device may also be configured to connect simultaneously with more than one input device (e.g. to alternate or secondary input devices 950, which can include other input devices associated with a single workstation, or different input devices associated with multiple, physically adjacent workstations, or other comparable arrangements).

According to specific embodiments, an operator position sensor 930 may communicate with the activation control circuit 906 to indicate whether an operator is in position at a related work space associated with the input device 902. This indication regarding operator position may be used as an initial required condition for enabling the input device 902.

According to some embodiments, the activation trigger 904 can, when actuated, cause the activation control circuit 906 to release the user input controls 908 and permit inputs to register and be transmitted from the user input controls 908 via a network 920. User inputs can be transmitted to, e.g., one or more automated mechanisms via an automated mechanism controller 934, or to a system control module 932, which can further include processing processor 936 and memory 938 for controlling operation of various automated systems. According to some specific embodiments, the activation trigger 904 can enable the activation control circuit 906 to pass through commands received at the user input controls 908, such that the activation control circuit 906 performs a gateway function, preventing user inputs from being transmitted when the input device 902 is disabled, and facilitating the transmission of user inputs when the input device is enabled via the activation trigger 904.

Figure 10:
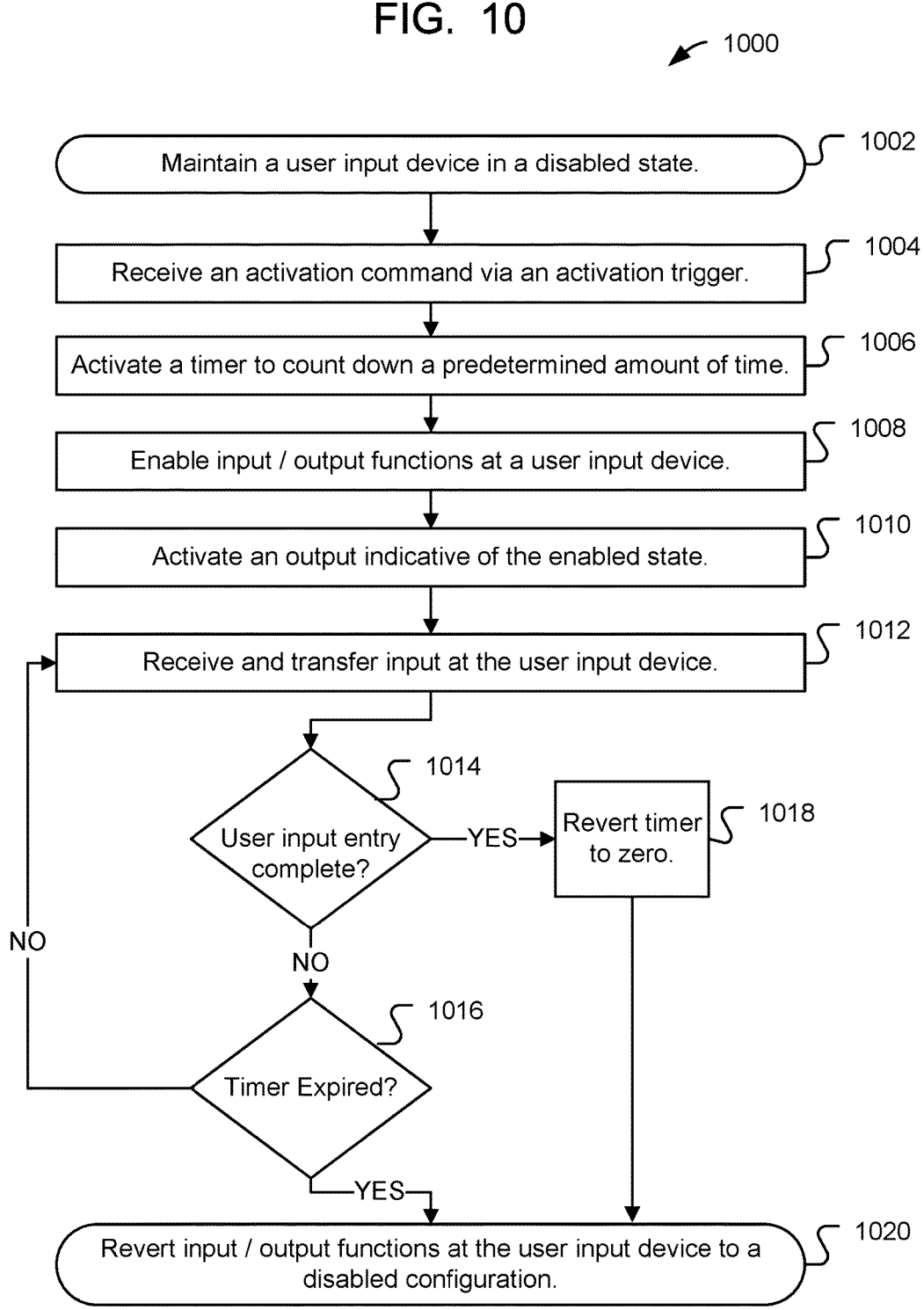
FIG. 10 illustrates a first example process for enabling and disabling an industrial safe input device, in accordance with embodiments.

FIG. 10 illustrates a first example process 1000 for enabling and disabling an industrial safe input device, in accordance with embodiments. Aspects of the process 1000 may be performed, in accordance with embodiments, by a similar system to systems 800 or 900 discussed with reference to FIGS. 8 and 9. The system may be implemented in an inventory system such as system 100 discussed with reference to FIG. 1.

In accordance with embodiments, a user input device can be maintained in a disabled state, preventing incidental keystrokes or control activations from taking effect in an inventory or comparable industrial or inventory system (act 1002). An activation command can be received via an activation trigger associated with the input device (act 1004). In response, the system can activate a timer to count down a predetermined amount of time for an operator to complete an input task at the input device (act 1006), and enable the input device to receive user input and transmit inputs to the system (act 1008). An output, such as a visible indicator light, message, or other suitable indicator can be activated as well to indicate to an operator that the input device is currently enabled (act 1010). The system can then receive and transfer user inputs via the user input device (act 1012).

While the user input device is enabled, the system can monitor the inputs at the user input device to determine whether an operator has concluded a command (act 1014). When this is the case, in certain embodiments, the system will conclude the current enabled cycle by reverting the timer back to zero (act 1018) and reverting the input device to a disabled state (act 1020).

While the user input device is enabled, the system can also monitor the timer (act 1016), and can continue receiving and/or transferring operator input via the input device (act 1012) while the timer is still counting down. Once the predetermined amount of time has expired, the system will revert the input/output functions at the input device to a disabled configuration (act 1020). In accordance with embodiments, the system can generate an output indicating to an operator that the input device has been disabled and/or to prompt the operator to begin again.

Figure 11:
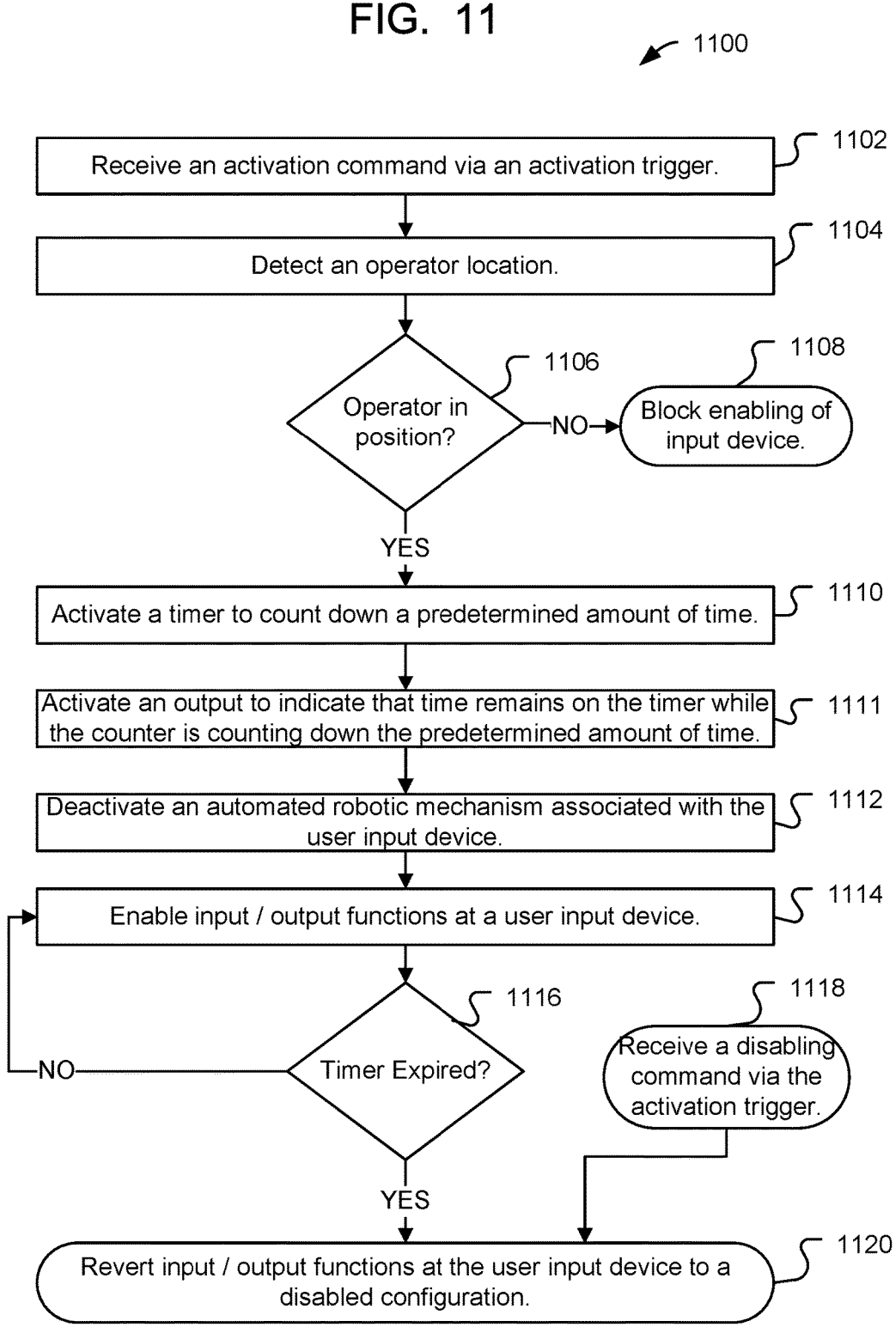
FIG. 11 illustrates a second example process for enabling and disabling an industrial safe input device, in accordance with embodiments.

FIG. 11 illustrates a second example process 1100 for enabling and disabling an industrial safe input device, in accordance with embodiments. Aspects of the process 1100 may be performed, in accordance with embodiments, by a similar system to systems 800 or 900 discussed with reference to FIG. 8 or 9. The system may be implemented in an inventory system such as system 100 discussed with reference to FIG. 1 or system 700 discussed with reference to FIG. 7. Except where explicitly contraindicated, process steps of the process 1100 may be combined with process steps of the process 1000 discussed with reference to FIG. 10.

In accordance with embodiments, an activation command can be received at a disabled user input device via an activation trigger (act 1102). The system can detect, via a sensor, an operator location with respect to a work station associated with the user input device (act 1104). If the operator is not in position (act 1106), the system can block enabling of the input device (act 1108), and may present an output indicative of the input device remaining disabled. If the operator is in position, the system can proceed to activate a timer to count down a predetermined amount of time (act 1110) during which the input device can remain enabled. While the timer is activated, the system can activate an output to indicate that the timer is currently counting down (act 1111). As described above with reference to FIG. 1, the output can respond to changes in the timer, e.g. reaching a threshold time remaining, expiring, or other criteria, in order to change the mode in which the output displays information to the user. In accordance with specific embodiments, the system can deactivate one or more automated systems, such as automated robotic mechanisms such as robotic drive units associated with the user input device (act 1112), in order to render those systems safe for close operator inspection or other activity. The system can also, in response to the activation command, enable input and/or output functionality at the user input device (act 1114).

While the user input device is enabled, the system can monitor the timer (act 1116), and continue receiving and transferring inputs while the timer is active (act 1114). When the timer expires, the system will revert the input/output functions of the input device to a disabled configuration (act 1120). In accordance with embodiments, the system can also monitor the activation trigger for additional commands. For example, according to some embodiments, a disabling command may be received at any time via the activation trigger (act 1118), i.e. where the activation trigger is an enabling switch and the trigger is reverted to the deactivated configuration, which will also cause the system to revert the input device to the disabled configuration.

Some or all of the processes 1000 or 1100 (or any other processes described herein, or variations, and/or combinations thereof) may be performed under the control of one or more computer systems configured with executable instructions, and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 12:
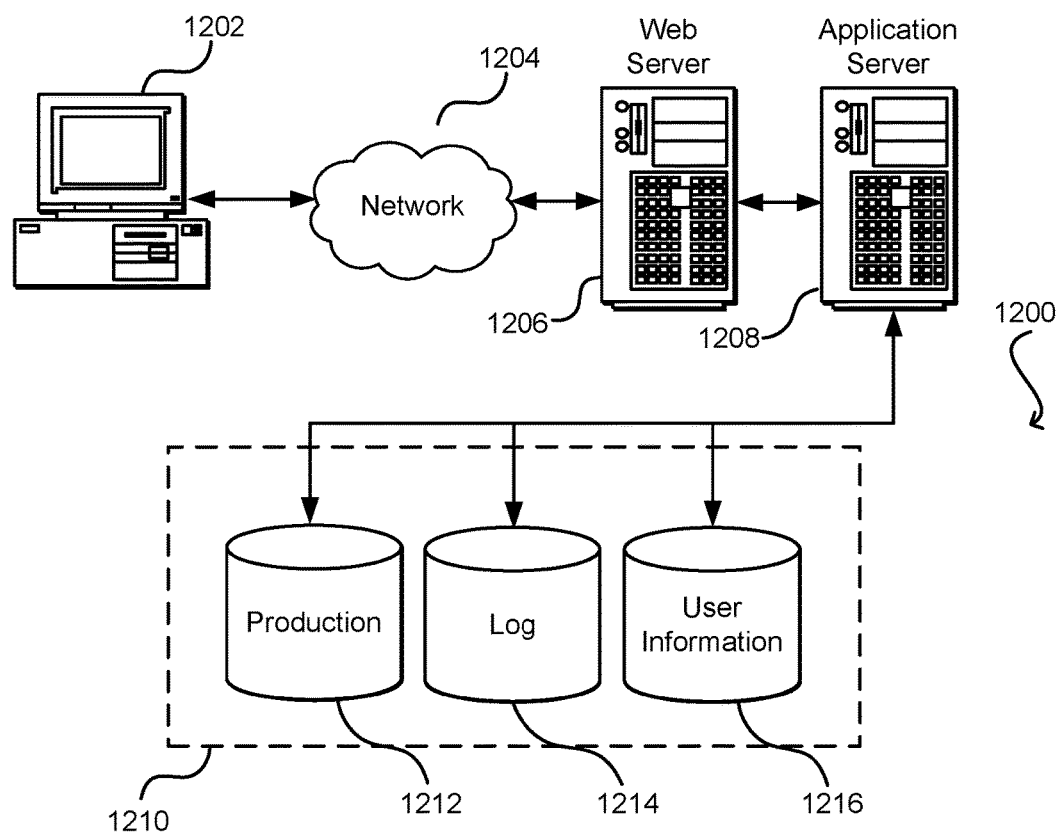
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An input device for use in an industrial system, the input device comprising:
input controls mountable to an industrial workstation within the industrial system and operable by a user, when mounted to the industrial workstation, to generate input to the industrial workstation, the industrial workstation associated with one or more mechanisms in the industrial system;
an activation trigger configurable by the user from a disable configuration to an enable configuration;
an output configured to communicate an enabled status of the input controls to the user; and
a controller having a processor and memory containing executable instructions that, when executed by the processor, cause the controller to:
when the activation trigger is reconfigured from the disable configuration to the enable configuration, enable input from the input controls to the industrial workstation for a configurable amount of time and cause the output to communicate the enabled status of the input controls to the user; and
disable input from the input controls to the industrial system subsequent to the enablement of the input controls for the configurable amount of time.

2. The system of claim 1, wherein the input device comprises a casing and a user interface presented at a surface of the casing, and wherein the activation trigger is connected with the casing and offset from the user interface.

3. The system of claim 1, wherein the activation trigger, when released, reconfigures gradually from the enable configuration to the disable configuration.

4. The system of claim 1, further comprising:
a sensor configured to detect a position of an operator in a workspace corresponding to the input device,
wherein the controller is further configured to prevent the enabling of the input controls when the sensor detects that the operator is out of position.

5. The system of claim 1, wherein the configurable amount of time is determined based on a criterion corresponding to a time required to perform a task associated with the industrial workstation.

6. The system of claim 1, further comprising an automated mechanism, wherein:
the input device is mounted on the automated mechanism; and
the controller is further configured to disable the automated mechanism when the activation trigger is actuated.

7. The system of claim 1, wherein:
the activation trigger further comprises two or more discrete controls separated from one another by at least one intervening control of the input controls; and
the controller is further configured to detect a series of user inputs at the two or more discrete controls and reconfigure the activation trigger to the enable configuration based on the detecting.

8. A method for preventing inadvertent input from an input device to an industrial system, the method comprising:
maintaining a user input device mounted to an industrial workstation within an industrial system, the user input device operable by a user to generate input to the industrial workstation associated with one or more mechanisms in the industrial system;
receiving an activation command via an activation trigger of the user input device indicating that the activation trigger has been moved from a disable position to an enable position;
activating a timer to count down a period of time based on receiving the activation command; and
enabling input from the user input device to the one or more mechanisms in the industrial system for a duration of the period of time.

9. The method of claim 8, further comprising:
receiving a deactivation command via the activation trigger indicative that the activation trigger has been returned to the disable position; and
disabling the user input device based on receiving the deactivation command.

10. The method of claim 8, further comprising:
causing an activation indicia to be displayed to a user when the user input device is enabled to transmit user inputs.

11. The method of claim 8, wherein the user input device comprises input controls and wherein the user input device, prior to receiving the activation command, operates in a disabled state during which activation of the input controls fail to produce a transmission, and wherein the method further comprises:
causing a disabled indicia to be displayed to a user when the user input device operates in the disabled state.

12. The method of claim 8, further comprising:
sensing a position of an operator in a workspace corresponding to the input device via a sensor; and
disabling the input device when the sensor senses that the user is out of position.

13. The method of claim 8, further comprising:
causing a robotic drive unit associated with the user input device to cease operation in response to receiving the activation command via the activation trigger.

14. An input device, comprising:
input controls mountable to an industrial workstation within an industrial system, the input controls operable by a user, when mounted to the industrial workstation, to generate input to one or more mechanisms in the industrial system;
an activation trigger configurable by the user from a disable configuration to an enable configuration; and
a controller having a processor and memory containing executable instructions that, when executed by the processor, cause the controller to:
when the activation trigger is reconfigured from the disable configuration to the enable configuration, enable input from the input controls to the industrial system for an amount of time; and
disable input from the input controls to the industrial system subsequent to the enablement of the input controls for the amount of time.

15. The device of claim 14, wherein the activation trigger comprises a rotating element configurable to rotate between a first orientation corresponding to the disable configuration and a second orientation corresponding to the enable configuration, and configured to return to the disable configuration from the enable configuration when released.

16. The device of claim 14, wherein:
the activation trigger is configured to return to the disable configuration from the enable configuration when released by the user; and the controller is further configured to disable input from the input controls when the activation trigger is returned to the disable configuration from the enable configuration.

17. The device of claim 14, wherein the input device is a mobile device.

18. The device of claim 14, further comprising a modular control device configured to communicate electronically with the input controls, wherein:
   the modular control device is removable from and connectible to the input controls; and
   the activation trigger is mounted to the modular control device.

19. The device of claim 14, further comprising a modular control device configured to communicate electronically with the input controls, wherein:
   the modular control device is configured to communicate wirelessly with the input controls; and
   the activation trigger is mounted to the modular control device.

20. The device of claim 14, further comprising a physical barrier associated with the activation trigger having an open position and a closed position, wherein:
   the activation trigger is accessible to the user when the physical barrier is in the open position and inaccessible when the activation trigger is in the closed position; and
   the physical barrier is configured to return from the open position to the closed position when released by the user.

21. The device of claim 14, wherein the activation trigger comprises a key and a key receiving socket configured to turn via the key from the disable configuration to the enable configuration.

22. The device of claim 14, wherein:
   the activation trigger comprises a key card having an associated identifier and a key card receiving socket configured to receive the key card and to turn via the key card from the disable configuration to the enable configuration;
   the key card receiving socket comprises a sensor configured to detect the identifier associated with the key card; and
   the controller is further configured to log information associated with the identifier when the key card is received in the socket.

23. The device of claim 14, wherein the amount of time corresponding to the enable configuration is selected based on a specific task corresponding to the input device.

24. The device of claim 14, wherein the input device is positioned in the industrial system so as to be accessible to a user from within a safe work area.

25. The device of claim 14, wherein the input device is positioned within a safe work area within the industrial system.

* * * * *